United States Patent
Dhomeja et al.

(10) Patent No.: US 10,051,655 B2
(45) Date of Patent: Aug. 14, 2018

(54) METHODS AND APPARATUS

(71) Applicant: Nokia Solutions and Networks Oy, Espoo (FI)

(72) Inventors: Sheyam Lal Dhomeja, Espoo (FI); Jing He, Beijing (CN); Feng Zhu, Hangzhou (CN); Bindhya Vashini Tiwari, Vantaa (FI)

(73) Assignee: Nokia Solutions and Networks Oy, Espoo (FI)

( * ) Notice: Subject to any disclaimer, the term of this patent is extended or adjusted under 35 U.S.C. 154(b) by 25 days.

(21) Appl. No.: 14/905,898

(22) PCT Filed: Jul. 19, 2013

(86) PCT No.: PCT/EP2013/065261
§ 371 (c)(1),
(2) Date: Jan. 18, 2016

(87) PCT Pub. No.: WO2015/007332
PCT Pub. Date: Jan. 22, 2015

(65) Prior Publication Data
US 2016/0165629 A1    Jun. 9, 2016

(51) Int. Cl.
*H04W 72/12* (2009.01)
*H04W 68/02* (2009.01)

(52) U.S. Cl.
CPC ........ *H04W 72/1273* (2013.01); *H04W 68/02* (2013.01)

(58) Field of Classification Search
CPC .......................... H04W 72/1273; H04W 68/02
See application file for complete search history.

(56) References Cited

U.S. PATENT DOCUMENTS

2008/0130770 A1* 6/2008 Khandekar ......... H04L 27/3809
  375/260
2009/0318170 A1  12/2009 Lee et al. ................. 455/458

FOREIGN PATENT DOCUMENTS

WO    WO 2011/137432 A1    11/2011

OTHER PUBLICATIONS

3GPP TS 22.168 V8.3.0 (Dec. 2012), "3$^{rd}$ Generation Partnership Project; Technical Specification Group Services and System Aspects; Earthquake and Tsunami Warning System (ETWS) requirements; Stage 1 (Release 8)", 12 pgs.
3GPP TS 25.435 V 11.2.0 (Mar. 2013), "3$^{rd}$ Generation Partnership Project; Technical Specification Group Radio Access Network; UTRAN $I_{ub}$ interface user plane protocols for Common Transport Channel data streams (Release 11)", 64 pgs.
TSG-RAN Working Group 3 Meeting #25, Makuhari, Japan, Nov. 26-30, 2001, R3-013321, "UEs Multiplexing in Frame Protocol for HS-DSCH", Siemens, 6 pgs.

* cited by examiner

*Primary Examiner* — Mohammad S Anwar
(74) *Attorney, Agent, or Firm* — Harrington & Smith

(57) ABSTRACT

A method includes receiving information at a base station for a plurality of user equipment, said information including respective data for a plurality of user equipment, said respective data to be transmitted in a same scheduling interval, and causing said respective data to be transmitted in the same scheduling interval.

21 Claims, 7 Drawing Sheets

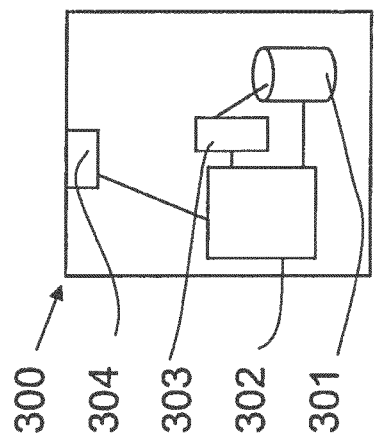
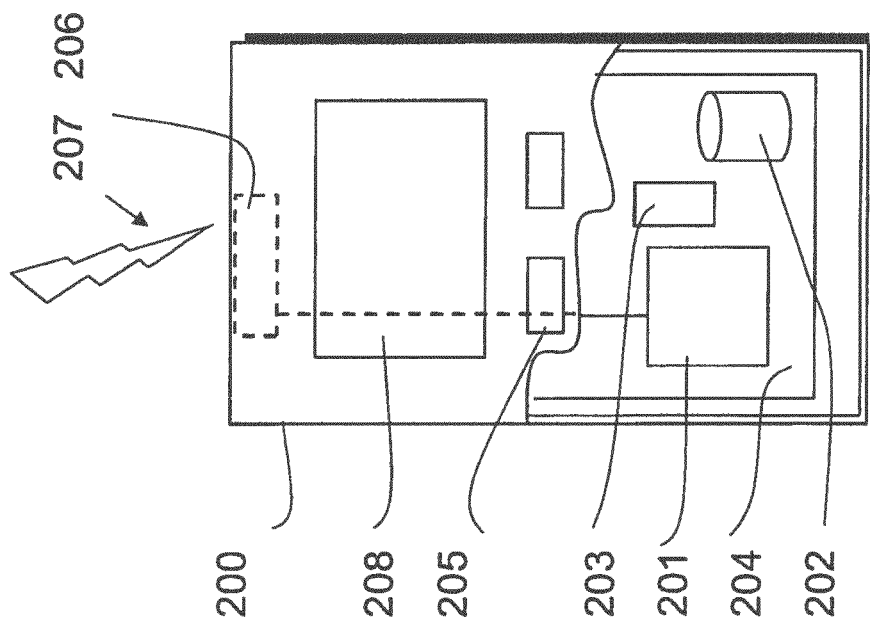
Figure 3
Figure 2

METHODS AND APPARATUS

Some embodiments relate to a methods and apparatus and in particular but not exclusively to methods and apparatus for use when providing data to a plurality of user equipment.

A communication system can be seen as a facility that enables communication sessions between two or more entities such as fixed or mobile communication devices, base stations, servers and/or other communication nodes. A communication system and compatible communicating entities typically operate in accordance with a given standard or specification which sets out what the various entities associated with the system are permitted to do and how that should be achieved. For example, the standards, specifications and related protocols can define the manner how various aspects of communication shall be implemented between communicating devices. A communication can be carried on wired or wireless carriers. In a wireless communication system at least a part of communications between stations occurs over a wireless link.

Examples of wireless systems include public land mobile networks (PLMN) such as cellular networks, satellite based communication systems and different wireless local networks, for example wireless local area networks (WLAN). A wireless system can be divided into cells or other radio coverage or service areas. A radio service area is provided by a station. Radio service areas can overlap, and thus a communication device in an area can typically send signals to and receive signals from more than one station.

A user can access the communication system by means of an appropriate communication device. A communication device of a user is often referred to as user equipment (UE) or terminal. A communication device is provided with an appropriate signal receiving and transmitting arrangement for enabling communications with other parties. Typically a communication device is used for enabling receiving and transmission of communications such as speech and data. In wireless systems a communication device provides a transceiver station that can communicate with another communication device such as e.g. a base station and/or another user equipment. The communication device may access a carrier provided by a station, for example a base station, and transmit and/or receive communications on the carrier.

An example of communication systems is an architecture that is being standardized by the 3rd Generation Partnership Project (3GPP). The various development stages of the 3GPP specifications are referred to as releases. HSPA (high speed packet access) has been proposed to improve the downlink and uplink transmission (HSDPA—high speed downlink packet access, HSUPA—high speed uplink packet access).

According to an aspect, there is provided a method comprising: receiving information at a base station for a plurality of user equipment, said information comprising respective data for a plurality of user equipment, said respective data to be transmitted in a same scheduling interval; and causing said respective data to be transmitted in the same scheduling interval.

The method may comprise receiving said information for said plurality of user equipment in one frame.

The frame may comprise a plurality of parts which are associated with respective ones of said user equipment, each of said parts associated with a respective one of said user equipment comprising information indicating if there is a subsequent part containing respective data to be transmitted in the same scheduling interval.

The method may comprise receiving said information for said plurality of users in respective frames.

Each frame may comprise information indicating if there is a subsequent frame contaming respective data to be transmitted in the same scheduling interval.

The method may comprise causing a control channel to be transmitted, said control channel comprising control information for said plurality of user equipment, said control information being such that each of said user equipment is configured to use identity information to decode control information for that user equipment.

The control channel may be a shared channel.

The method may comprise causing said data to be transmitted in a physical downlink channel.

The physical downlink channel may be a shared channel.

The respective data may comprise one or more of: a packet data unit, a paging message and a control signal message.

The packet data unit may comprise one or more logical channel packet data units.

The respective data may comprise two or more packet data units for at least two different logical channels.

The logical channel may be one or more of a traffic channel and a control channel. The paging message may comprise mobile terminating call (MTC) paging.

The information may comprise identity information for each of said user equipment.

The information may comprise scheduling information identifying said scheduling interval.

The scheduling information may comprise frame number information.

The frame number information may comprise connection frame number information.

The method may comprise receiving paging information at said base station for said plurality of user equipment.

The method may comprise causing said paging information to be transmitted in a previously scheduling interval to said same scheduling interval.

The information may be received in a HS-DSCH DATA FRAME TYPE 3 message.

The user equipment may be in a relatively low energy connected state. The relatively low energy connected state may be a Cell PCH or URA PCH state. The method may be performed by an apparatus of a base station.

According to another aspect, there is provided a method comprising: receiving at a user equipment in a relatively low energy connected state in which said user equipment is without a dedicated identity, a paging message, said paging message causing the user equipment to receive a reconfiguration message in a next scheduling interval.

The relatively low energy connected state may be a Cell PCH or URA PCH state.

The user equipment may be without a dedicated H-RNTI.

The reconfiguration message may be a radio bearer reconfiguration message.

The reconfiguration message may be a radio resource control message.

The paging message may be a PAGING TYPE 1 message.

The paging message may comprise an information element, said information element causing said user equipment to receive said reconfiguration message in the next scheduling interval.

The scheduling interval may comprise a frame number. The frame number may comprise a connection frame number.

According to another aspect, there is provided a method comprising: causing information to be transmitted to a base station for a plurality of user equipment, said information comprising respective data for a plurality of user equipment, said respective data to be transmitted in a same scheduling interval.

The method may comprise causing said information for said plurality of user equipment to be transmitted in one frame.

The frame may comprise a plurality of parts which are associated with respective ones of said user equipment, each of said parts associated with a respective one of said user equipment comprising information indicating if there is a subsequent part containing respective data to be transmitted in the same scheduling interval.

The method may comprise causing said information for said plurality of users to be transmitted in respective frames.

Each frame may comprise information indicating if there is a subsequent frame containing respective data to be transmitted in the same scheduling interval.

The respective data may comprise one or more of: a packet data unit, a paging message and a control signal message.

The packet data unit comprises one or more of logical channel packet data units.

The respective data may comprise two or more packet data units for at least two different logical channels.

The one or more logical channels may be one or more of a traffic channel and a control channel.

The paging message may comprise mobile terminating call (MTC) paging.

The information may comprise identity information for each of said user equipment.

The information may comprise scheduling information identifying said scheduling interval.

The scheduling information may comprise frame number information.

The frame number information may comprise connection frame number information.

The method may comprise causing paging information to be transmitted to said base station for said plurality of user equipment.

The information may be provided in a HS-DSCH DATA FRAME TYPE 3 message.

The user equipment may be in a relatively low energy connected state. The relatively low energy connected state may be a Cell PCH or URA PCH state.

The method may be performed in the apparatus of a radio network controller. According to another aspect, there is provided an apparatus comprising at least one processor and at least one memory including computer code for one or more programs, the at least one memory and the computer code configured, with the at least one processor, to cause the apparatus at least to: receive information for a plurality of user equipment, said information comprising respective data for a plurality of user equipment, said respective data to be transmitted in a same scheduling interval; and cause said respective data to be transmitted in the same scheduling interval.

The at least one memory and the computer code may be configured, with the at least one processor, to cause the apparatus to receive said information for said plurality of user equipment in one frame.

The frame may comprise a plurality of parts which are associated with respective ones of said user equipment, each of said parts associated with a respective one of said user equipment comprising information indicating if there is a subsequent part containing respective data to be transmitted in the same scheduling interval.

The at least one memory and the computer code may be configured, with the at least one processor, to cause the apparatus to receive said information for said plurality of users in respective frames.

Each frame may comprise information indicating if there is a subsequent frame containing respective data to be transmitted in the same scheduling interval.

The at least one memory and the computer code may be configured, with the at least one processor, to cause the apparatus to cause a control channel to be transmitted, said control channel comprising control information for said plurality of user equipment, said control information being such that each of said user equipment is configured to use identity information to decode control information for that user equipment.

The control channel may be a shared channel.

The at least one memory and the computer code may be configured, with the at least one processor, to cause the apparatus to cause said data to be transmitted in a physical downlink channel.

The physical downlink channel may be a shared channel.

The respective data may comprise one or more of: a packet data unit, a paging message and a control signal message.

The packet data unit may comprise one or more logical channel packet data units.

The respective data may comprise two or more packet data units for at least two different logical channels.

The logical channel may be one or more of a traffic channel and a control channel.

The paging message may comprise mobile terminating call (MTC) paging.

The information may comprise identity information for each of said user equipment.

The information may comprise scheduling information identifying said scheduling interval.

The scheduling information may comprise frame number information.

The frame number information may comprise connection frame number information.

The at least one memory and the computer code may be configured, with the at least one processor, to cause the apparatus to receiving paging information for said plurality of user equipment.

The at least one memory and the computer code may be configured, with the at least one processor, to cause the apparatus to cause said paging information to be transmitted in a previously scheduling interval to said same scheduling interval.

The information may be received in a HS-DSCH DATA FRAME TYPE 3 message.

The apparatus may be provided in a base station.

According to another aspect, there is provided an apparatus comprising at least one processor and at least one memory including computer code for one or more programs, the at least one memory and the computer code configured, with the at least one processor, to cause the apparatus at least to: causing information to be transmitted to a base station for a plurality of user equipment, said information comprising respective data for a plurality of user equipment, said respective data to be transmitted in a same scheduling interval.

The at least one memory and the computer code may be configured, with the at least one processor, to cause the apparatus to cause said information for said plurality of user equipment to be transmitted in one frame.

The frame may comprise a plurality of parts which are associated with respective ones of said user equipment, each of said parts associated with a respective one of said user equipment comprising information indicating if there is a subsequent part containing respective data to be transmitted in the same scheduling interval.

The at least one memory and the computer code may be configured, with the at least one processor, to cause the apparatus to cause said information for said plurality of users to be transmitted in respective frames.

Each frame may comprise information indicating if there is a subsequent frame containing respective data to be transmitted in the same scheduling interval.

The respective data may comprise one or more of: a packet data unit, a paging message and a control signal message.

The packet data unit comprises one or more logical channel packet data units.

The respective data may comprise two or more packet data units for at least two different logical channels.

The one or more logical channels may be one or more of a traffic channel and a control channel.

The paging message may comprise mobile terminating call (MTC) paging.

The information may comprise identity information for each of said user equipment.

The information may comprise scheduling information identifying said scheduling interval.

The scheduling information may comprise frame number information.

The frame number information may comprise connection frame number information.

The at least one memory and the computer code may be configured, with the at least one processor, to cause the apparatus to cause paging information to be transmitted to said base station for said plurality of user equipment.

The information may be provided in a HS-DSCH DATA FRAME TYPE 3 message.

A radio network controller may comprise the apparatus.

According to another aspect, there is provided an apparatus in a user equipment comprising at least one processor and at least one memory including computer code for one or more programs, the at least one memory and the computer code configured, with the at least one processor, to cause the apparatus at least to: receive a paging message, said paging message causing the user equipment to receive a reconfiguration message in a next scheduling interval.

The user equipment may be in a relatively low energy connected state in which said user equipment is without a dedicated identity.

The relatively low energy connected state may be a Cell PCH or URA PCH state.

The user equipment may be without a dedicated H-RNTI.

The reconfiguration message may be a radio bearer reconfiguration message.

The reconfiguration message may be a radio resource control message.

The paging message may be a PAGING TYPE 1 message.

The paging message may comprise an information element, said information element causing said user equipment to receive said reconfiguration message in the next scheduling interval.

The scheduling interval may comprise a frame number. The frame number may comprise a connection frame number.

According to another aspect, there is provided an apparatus comprising: means for receiving information for a plurality of user equipment, said information comprising respective data fora plurality of user equipment, said respective data to be transmitted in a same scheduling interval; and means for causing said respective data to be transmitted in the same scheduling interval.

The receiving means may be for receiving said information for said plurality of user equipment in one frame.

The frame may comprise a plurality of parts which are associated with respective ones of said user equipment, each of said parts associated with a respective one of said user equipment comprising information indicating if there is a subsequent part containing respective data to be transmitted in the same scheduling interval.

The receiving means may be for receiving said information for said plurality of users in respective frames.

Each frame may comprise information indicating if there is a subsequent frame containing respective data to be transmitted in the same scheduling interval.

The causing means may be for causing a control channel to be transmitted, said control channel comprising control information for said plurality of user equipment, said control information being such that each of said user equipment is configured to use identity information to decode control information for that user equipment.

The control channel may be a shared channel.

The causing means may be for causing said data to be transmitted in a physical downlink channel.

The physical downlink channel may be a shared channel.

The respective data may comprise one or more of: a packet data unit, a paging message and a control signal message.

The packet data unit may comprise one or more logical channel packet data units.

The respective data may comprise two or more packet data units for at least two different logical channels.

The logical channel may be one or more of a traffic channel and a control channel.

The paging message may comprise mobile terminating call (MTC) paging.

The information may comprise identity information for each of said user equipment.

The information may comprise scheduling information identifying said scheduling interval.

The scheduling information may comprise frame number information.

The frame number information may comprise connection frame number information.

The receiving means may be for receiving paging information for said plurality of user equipment.

The causing means may be for causing said paging information to be transmitted in a previously scheduling interval to said same scheduling interval.

The information may be received in a HS-DSCH DATA FRAME TYPE 3 message.

A base station may comprise the apparatus.

According to another aspect, there is provided an apparatus comprising: means for causing information to be transmitted fora plurality of user equipment, said information comprising respective data for a plurality of user equipment, said respective data to be transmitted in a same scheduling interval.

The causing means may be for causing said information for said plurality of user equipment to be transmitted in one frame.

The frame may comprise a plurality of parts which are associated with respective ones of said user equipment, each of said parts associated with a respective one of said user equipment comprising information indicating if there is a subsequent part containing respective data to be transmitted in the same scheduling interval.

The causing means may be for causing said information for said plurality of users to be transmitted in respective frames.

Each frame may comprise information indicating if there is a subsequent frame containing respective data to be transmitted in the same scheduling interval.

The respective data may comprise one or more of: a packet data unit, a paging message and a control signal message.

The packet data unit comprises one or more logical channel packet data units.

The respective data may comprise two or more packet data units for at least two different logical channels.

The one or more logical channels may be one or more of a traffic channel and a control channel.

The paging message may comprise mobile terminating call (MTC) paging.

The information may comprise identity information for each of said user equipment.

The information may comprise scheduling information identifying said scheduling interval.

The scheduling information may comprise frame number information.

The frame number information may comprise connection frame number information.

The causing means may be for causing paging information to be transmitted to said base station for said plurality of user equipment.

The information may be provided in a HS-DSCH DATA FRAME TYPE 3 message.

A radio network controller may comprise said apparatus.

According to another aspect, there is provided an apparatus in a user equipment, the apparatus comprising: means for receiving a paging message, said paging message causing the user equipment to receive a reconfiguration message in a next scheduling interval.

The user equipment may be in a relatively low energy connected state in which said user equipment is without a dedicated identity.

The relatively low energy connected state may be a Cell PCH or URA PCH state.

The user equipment may be without a dedicated H-RNTI.

The reconfiguration message may be a radio bearer reconfiguration message.

The reconfiguration message may be a radio resource control message.

The paging message may be a PAGING TYPE 1 message.

The paging message may comprise an information element, said information element causing said user equipment to receive said reconfiguration message in the next scheduling interval.

The scheduling interval may comprise a frame number. The frame number may comprise a connection frame number.

According to another aspect, there is provided a frame comprise a plurality of parts which are associated with respective ones of user equipment, each of said parts associated with a respective one of said user equipment comprising information indicating if there is a subsequent part containing respective data to be transmitted in a same scheduling interval as data in that part.

According to another aspect, there is provided a first frame associated with a first user equipment, said first frame comprising information indicating if there is a subsequent frame containing data to be transmitted in a same scheduling interval as data in that first frame.

According to another aspect, there is provided a paging message comprising information configured to cause a user equipment to receive a reconfiguration message in a next scheduling interval In the above, many different embodiments have been described. It should be appreciated that further embodiments may be provided by the combination of any two or more of the embodiments described above.

A computer program comprising program code means adapted to perform the method may also be provided. The computer program may be stored and/or otherwise embodied by means of a carrier medium.

Various other aspects and further embodiments are also described in the following detailed description and in the attached claims.

Reference will now be made by way of example only to the accompanying Figures in which:

FIG. 1*a* shows a schematic diagram of a network;

FIG. 1*b* shows a network;

FIG. 2 shows a schematic diagram of a mobile communication device;

FIG. 3 shows a schematic diagram of a control apparatus;

Figure 1A:
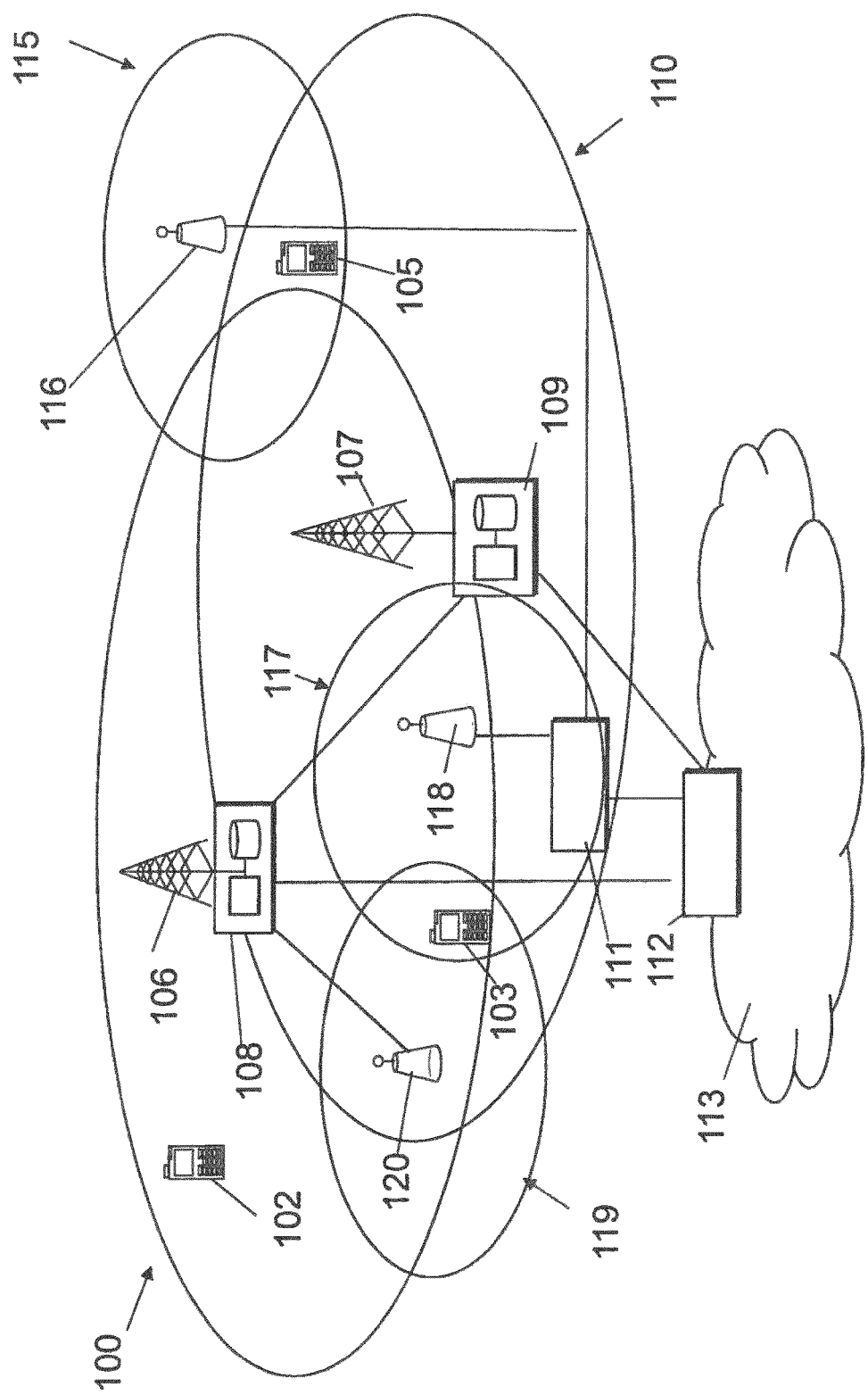

In the following certain exemplifying embodiments are explained with reference to a wireless or mobile communication system serving mobile communication devices. Before explaining in detail the exemplifying embodiments, certain general principles of a wireless communication system and mobile communication devices are briefly explained with reference to FIGS. 1 to 3 to assist in understanding the technology underlying the described examples.

In a wireless communication system mobile communication devices or user equipment (UE) 102, 103, 105 are provided wireless access via at least one base station or similar wireless transmitting and/or receiving node or point. In the FIG. 1*a* example two overlapping access systems or radio service areas of a cellular system 100 and 110 and three smaller radio service areas 115, 117 and 119 provided by base stations 106, 107, 116, 118 and 120 are shown. Each mobile communication device and station may have one or more radio channels open at the same time and may send signals to and/or receive signals from more than one source. It is noted that the radio service area borders or edges are schematically shown for illustration purposes only in FIG. 1*a*. It shall also be understood that the sizes and shapes of radio service areas may vary considerably from the shapes of FIG. 1*a*. A base station site can provide one or more cells. A base station can also provide a plurality of sectors, for example three radio sectors, each sector providing a cell or a subarea of a cell. All sectors within a cell can be served by the same base station.

Figure 1B:
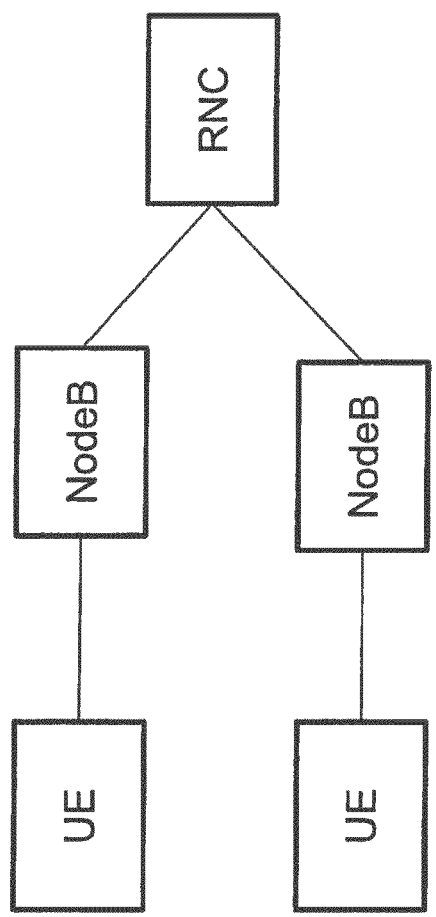

Base stations are typically controlled by at least one appropriate controller apparatus so as to enable operation thereof and management of mobile communication devices in communication with the base stations. In FIG. 1 a control apparatus 108 and 109 is shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, such as discussed in relation to FIG. 1b. the control apparatus may additionally or alternatively be provided in a radio network controller.

In FIG. 1e stations 106 and 107 are shown as connected to a wider communications network 113 via gateway 112. A further gateway function may be provided to connect to another network.

The smaller stations 116, 118 and 120 can also be connected to the network 113, for example by a separate gateway function and/or via the controllers of the macro level stations. In the example, stations 116 and 118 are connected via a gateway 111 whilst station 120 connects via the controller apparatus 108. In some embodiments, the smaller stations may not be provided.

Reference is made to FIG. 1b which schematically shows a UMTS network with the entities in accordance with the terminology of that standard. The base station is a node B which communicates with one or more user equipment. The node Bs are controlled by a radio network controller RNC.

A possible mobile communication device will now be described in more detail with reference to FIG. 2 showing a schematic, partially sectioned view of a communication device 102. Such a communication device is often referred to as user equipment (UE) or terminal. An appropriate mobile communication device may be provided by any device capable of sending and receiving radio signals. Non-limiting examples include a mobile station (MS) such as a mobile phone or what is known as a 'smart phone', a computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information.

The mobile device 102 may receive signals over an air interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A wireless communication device can be provided with a Multiple Input/Multiple Output (MIMO) antenna system. MIMO arrangements as such are known. MIMO systems use multiple antennas at the transmitter and receiver along with advanced digital signal processing to improve link quality and capacity. Although not shown in FIGS. 1 and 2, multiple antennas can be provided, for example at base stations and mobile stations, and the transceiver apparatus 206 of FIG. 2 can provide a plurality of antenna ports. More data can be received and/or sent where there are more antenna elements. A station may comprise an array of multiple antennas. Signalling and muting patterns can be associated with Tx antenna numbers or port numbers of MIMO arrangements.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

FIG. 3 shows an example of a control apparatus. This control apparatus may be provided in the RNC and/or base station. The control apparatus 109 comprises at least one memory 301, at least one data processing unit 302, 303 and an input/output interface 304. Via the interface the control apparatus may be coupled to a receiver and/or a transmitter of the base station or RNC. The control apparatus 109 can be configured to execute an appropriate software code to provide the control functions.

The communication devices 102, 103, 105 can access the communication system based on various access techniques, such as code division multiple access (CDMA), or wideband CDMA (WCDMA). Other examples include time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

A non-limiting example of the recent developments in communication system architectures is the W-CDMA of the Universal Mobile Telecommunications System (UMTS) that is being standardized by the 3rd Generation Partnership Project (3GPP) and is schematically illustrated in FIG. 1b. Other examples of radio access system include those provided by base stations of systems that are based on technologies such as wireless local area network (WLAN) and/or WiMax (Worldwide Interoperability for Microwave Access).

An enhanced Cell PCH (paging channel) feature has been introduced in release 7 of 3GPP specifications. The cell PCH state allows the user equipment to remain in a radio resource control (RRC) connected mode for a relatively long period of time whilst minimising the network and user equipment resource requirements. Typically, a user equipment may be paged in the cell PCH state but the response should be sent using the cell FACH (forward access channel). The RNC will keep track of the individual cell upon which the UE is camped.

In the cell PCH state, various logical channels may be mapped onto the HS-DSCH (high speed downlink shared channel). By way of example, these channels may include one or more of the BCCH (broadcast control channel), PCCH (paging control channel), DCCH (dedicated control channel) and DTCH (dedicated traffic channel). The BCCH may be used to broadcast system information. The PCCH may be used to wake up the user equipment with paging messages. The DCCH and the DTCH may be used to resume dedicated data and signalling transmission in the downlink without the need to set up channels.

The CELL_PCH state may have one or more of the following characteristics:
- No dedicated physical channel is allocated to the UE.
- The UE selects a PCH with an algorithm, and uses DRX (discontinuous reception) for monitoring the selected PCH via an associated PICH (paging indicator channel).
- No uplink activity is possible.
- The position of the UE is known by UTRAN on cell level according to the cell where the UE last made a cell update in CELL_FACH state.

It should be appreciated that a URA PCH is similar to the cell PCH that the location of the UE is known at a URA (UTRAN (UMTS (universal mobile telecommunications system) terrestrial radio access network) registration area) level instead of at a cell level.

If the HSDPA channels are configured for CELL_PCH, and/or URA_PCH, and UE supports reception of HS-DSCH in CELL_PCH and/or URA_PCH modes, then a UE may receive paging messages/control signalling faster than some legacy UEs. The UE may move to the CELL_FACH mode autonomously, without sending a CELL UPDATE message, if UE has been assigned a dedicated identifier in CELL_PCH. The dedicated identifier may be a H-RNTI (HSDPA radio network temporary identifier).

With CELL_FACH a UE can still transmit and receive relatively small packets of data without excessively draining their battery.

The CELL_FACH state may have one or more of the following characteristics:
- No dedicated physical channel is allocated to the UE.
- The UE continuously monitors a FACH in the downlink.
- The UE is assigned a default common or shared transport channel in the uplink (e.g. RACH random access channel, Enhanced RACH) that it can use any time according to the access procedure for that transport channel.
- The position of the UE is known by UTRAN on the cell level according to the cell where the UE last made a cell update.
- In TDD (time division duplex) mode, one or several USCH (uplink shared channel) or DSCH (downlink shared channel) transport channels may have been established.

HS-DSCH DATA FRAME TYPE 3 was introduced in release 7 of 3GPP to support the sending of HS-DSCH transmissions to UEs in URA_PCH, and/or CELL_PCH. This may assume that a cell is configured with high speed (HS) channels in URA_PCH, and CELL_PCH. As UEs in URA_PCH, and CELL_PCH first need to be paged with PICH to indicate to the UEs that a paging message is coming in the next frame, a HS-DSCH DATA FRAME which carries a PI (paging indicator) bitmap, and a CFN (connection frame number) field is provided by HS-DSCH DATA FRAME TYPE 3.

The Node B receives a HS-DSCH DATA FRAME TYPE 3 carrying a PI bitmap, the H-RNTI indicator field HI=0, and the logical channel ID is 15 from the RNC. The Node B understands that in CFN-1 frame the Node B has to send to the UE a PICH containing a PI bitmap. In the next CFN frame, the Node B has to send a PCCH PDU (packet data unit) mapped to HS-DSCH/HS-PDSCH (high speed physical downlink shared channel). As the field HI=0, Node B does not transmit the HS-SCCH.

The Node B receives a HS-DSCH DATA FRAME TYPE 3 carrying a PI bitmap, CFN, a H-RNTI, field HI=1. The Node B understands that in CFN-1 frame the Node B has to send a PICH containing a PI bitmap. In the next CFN frame, the Node B has to send a DCCH PDU and/or DTCH PDU mapped to HS-DSCH/HS-PDSCH. As the field HI=1, Node B transmits the HS-SCCH (high speed shared control channel) encoded with a H-RNTI. In this case the, logical channel ID in the block field will not be 15. If the logical channel ID in block field is 15, this means that HS-DSCH DATA FRAME TYPE 3 carries a BCCH PDU, and the H-RNTI is the BCCH specific H-RNTI.

If a RNC receives a mobile terminated call (MTC) call for the UEs in URA_PCH and/or in CELL_PCH and those UEs have not got a dedicated H-RNTI, the RNC sends a RRC message PAGING TYPE 1 to these UEs to indicate a MTC call. A PAGING TYPE 1 message is used to send information on the paging channel to one or more UEs, in idle or connected mode. The message can contain other information. For this purpose, the RNC sends a PCCH PDU through HS-DSCH DATA FRAME TYPE 3 to the Node B. The HS-DSCH DATA FRAME TYPE 3 also carries the PI bitmap, CFN number, and other required information in the header. The format of the HS-DSCH DATA FRAME TYPE 3 is discussed in the standard 3GPP TS 25.435.

The RRC message PAGING TYPE 1 is used for the UEs in the URA_PCH which do not keep dedicated RNTIs in this state and for the UEs in CELL_PCH which have not been assigned a dedicated H-RNTI by the network. Therefore, the RNC does not need to put the H-RNTI in HS-DSCH DATA FRAME TYPE 3, when sending the PCCH PDU to node B through HS-DSCH DATA FRAME TYPE 3. The RRC message PAGING TYPE 1 may carry the paging records of up to 8 UEs in some embodiments. This means that the RNC could address MTC calls of up to a maximum 8 UEs belonging to same paging occasion.

On the other hand, if the RNC receives MTC calls for the UEs in CELL_PCH, which have been assigned a dedicated H-RNTI, then the RNC sends a RRC message PAGING TYPE 2 to these UEs to indicate a MTC call. In this regard, the RNC sends a DCCH PDU through the HS-DSCH DATA FRAME TYPE 3 to the Node B. The HS-DSCH DATA FRAME TYPE 3 also carries the PI bitmap information, the CFN number, the H-RNTI, and other required information in the header.

As THE HS-DSCH DATA FRAME TYPE 3 only has one space for the H_RNTI of one UE, therefore, if there are two or more UEs which have a MTC call, and all these UEs belong to same paging occasion, then the RNC can send a DCCH PDU for one UE only in a 10 ms TTI. The other UEs will be put in a queue by the RNC and will be considered in the next DRX cycle.

If the RNC receives a control signal for UEs in the CELL_PCH, which have been assigned a dedicated H-RNTI, the RNC sends the control signal in a DTCH PDU to UE after UE has received the PICH. The RNC sends the DTCH PDU through HS-DSCH DATA FRAME TYPE 3 to the Node B. The HS-DSCH DATA FRAME TYPE 3 carries the PI bitmap information, the CFN, the H-RNTI, and other required information in the header. Again, as there is field for one H-RNTI in the HS-DSCH DATA FRAME TYPE 3, the RNC can handle a control signal for only one UE in a paging occasion. If there are control signals for more than one UE in the same paging occasion, then RNC has to put the control signal requests for other UEs in a queue, and consider sending in the next DRX cycle.

The control signal may be any suitable signal. For example the control signal could be a call request message which may be sent by an originating UE to a terminating UE, when both UEs are in Cell_PCH.

The HS-DSCH DATA FRAME TYPE 3 currently supports only one H-RNTI in the given field. If there is mobile terminating call paging for more than one UE in the same paging occasion, and these UEs are assigned dedicated H-RNTIs by the network, then the HS-DSCH DATA FRAME TYPE 3 cannot handle more than one call in its frame. Other UEs, which have a call in the same paging occasion, have to wait and/or be in a queue for the next DRX cycle to be considered by RNC.

If there is a UE at the end of the queue, then it is possible that UE would starve as it would be too long before it is served by the RNC. The HSDPA channels were introduced in URA_PCH and CELL_PCH so that a UE could receive paging messages relatively quickly, and the UE could send the uplink data relatively quickly by entering into the CELL_FACH state autonomously. However due to the limitation in HS-DSCH DATA FRAME TYPE 3, this advantage of HSDPA channels in URA_PCH, and CELL_PCH may be lost. On the contrary, users may have to face delay. This may lead to a poor user experience.

Furthermore, the logical channel DCCH/DTCH and logical channel PCCH for different UEs cannot be scheduled in the same CFN with current proposals.

The logical channel CCCH (common control channel) could be proposed to carry the RRC message RADIO BEARER RECONFIGURATION so that UEs which have not been assigned a dedicated H-RNTI in the CELL_PCH state, could be brought to the CELL_FACH, and CELL DCH (dedicated channel) states faster than currently specified by 3GPP. The UE may be directed by the network through the PAGING TYPE 1 message to receive the RRC message RADIO BEARER RECONFIGURATION in the next CFN frame. The RRC message PAGING TYPE 1 may be provided with information to indicate to a paged UE that it should receive a RRC message RADIO BEARER RECONFIGURATION in the next CFN frame. The information may be provided by a new information element.

The network would have to send PCCH PDUs to other UEs in the same CFN. However, current limitations of HS-DSCH DATA FRAME TYPE 3 mean that the logical channel PCCH and logical channel CCCH of different UEs cannot be scheduled for the same CFN.

If there is Earthquake and Tsunami Warning System (ETWS) information or BCCH modification information which the RNC needs to convey to UEs capable of receiving the HS-DSCH in the CELL_PCH, and/or URA_PCH state, the RNC cannot send the ETWS information and/or BCCH modification information to all these UEs in one DRX cycle. Rather it takes two DRX cycles to inform all the UEs about ETWS Information and/or BCCH modification information. This is due to the limitation in HS-DSCH DATA FRAME TYPE 3, which does not allow the carrying of a PCCH PDU, and a BCCH PDU in the same HS-DSCH DATA FRAME TYPE 3. For the sending of ETWS Information to all the UEs in the cell, there is 3GPP requirement that 3GPP networks ensure that ETWS information is received by all the UEs in the cell within 4 seconds of the ETWS message being received at the 3GPP networks (see 3GPP TS 22.168). In such a situation, the RNC should be able to send the ETWS information to all the UEs in cell in one DRX cycle rather than two DRX cycles.

Some embodiments may address the problem of scheduling paging for more than one UE in the same CFN frame. In some embodiments, the HS-DSCH DATA FRAME TYPE3 is extended so that the RNC can indicate in a frame that there is more than one UE's data that needs to be scheduled in one CFN by the Node B.

In some embodiments, a flag or other indicator is provided in the HS-DSCH DATA FRAME TYPE3 to indicate to a Node B that a subsequent HS-DSCH DATA FRAME TYPE 3 frame includes another UE's data and that the Node B should schedule that other UE's data in one CFN together with current received HS-DSCH DATA FRAME TYPE 3 frame. This will be described with reference to FIGS. 4 and 5.

In some embodiments, the HS-DSCH DATA FRAME TYPE3 includes more than one UE's data in one frame. The Node B receives all UEs' data in one frame and schedules that data in the CFN indicated by the CFN field in HS-DSCH DATA FRAME TYPE 3. This will be described with reference to FIGS. 6 and 7.

Figure 4:
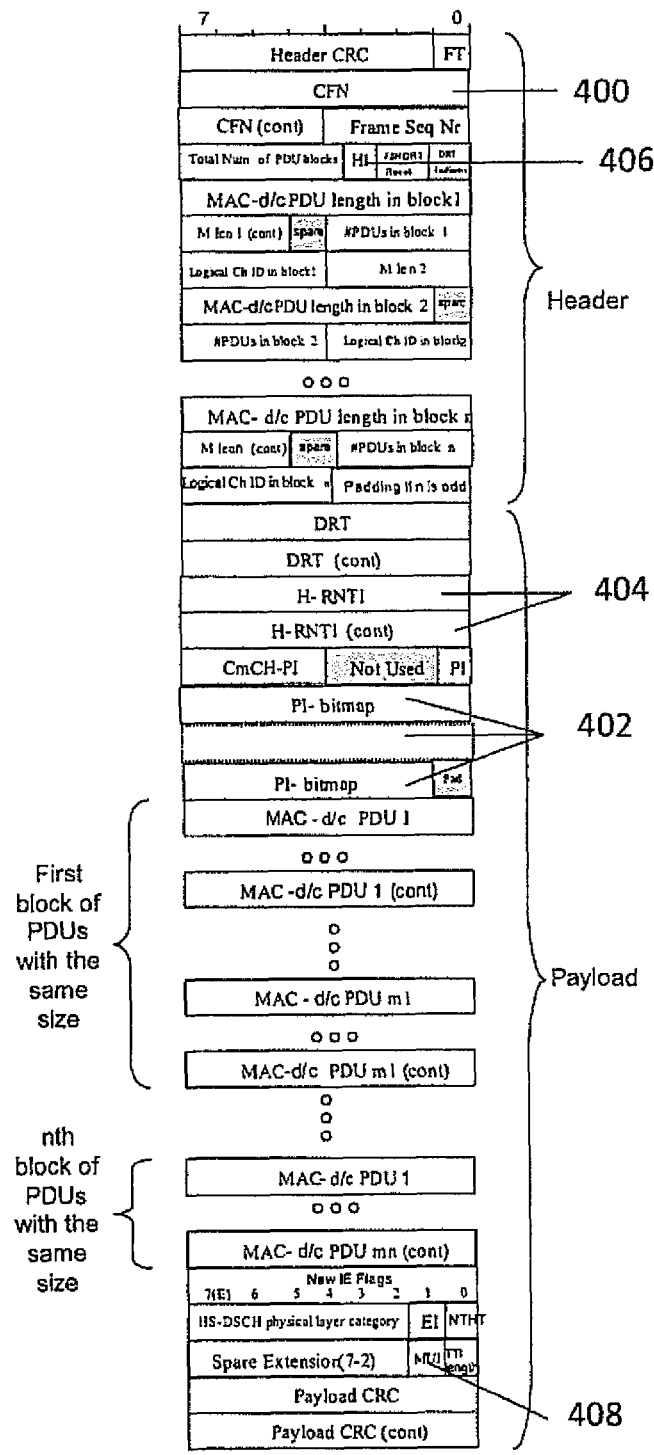
FIG. 4 shows a first frame of an embodiment.
Figure 5:
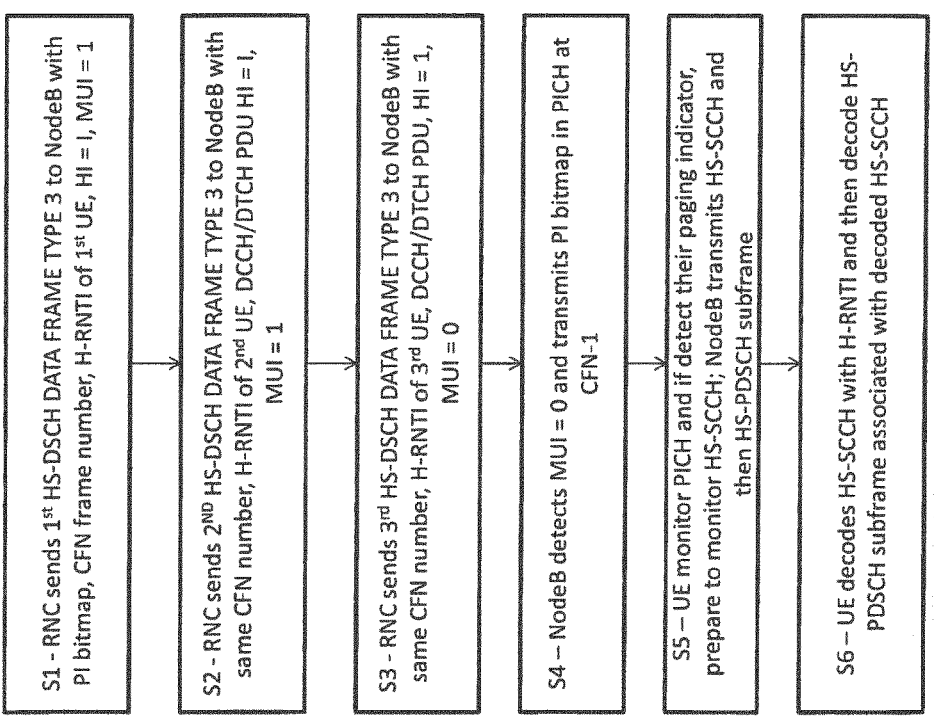
FIG. 5 shows a method flow associated with the frame of FIG. 4.

Reference is made to FIG. 4 which shows the HS-DSCH DATA FRAME TYPE3 with the information which indicates that a subsequent HS-DSCH DATA FRAME TYPE 3 frame includes another UE's data and that the Node B should schedule that other UE's data in one CFN together with current received HS-DSCH DATA FRAME TYPE 3 frame. FIG. 5 shows a method flow.

The example described with reference to FIGS. 4 and 5, the RNC has to send one or more of mobile terminating call (MTC) paging, a control signal message, a DCCH and/or DTCH PDU to three UEs. It should be appreciated that the RNC may be sending the same type of messaging to each of the three UEs or one or more of the UEs may be receiving a different type of messaging to the one or more other UEs.

In step S1, to send the above data for the first UE, the RNC sends first HS-DSCH DATA FRAME TYPE 3 to Node B. The HS-DSCH DATA FRAME TYPE 3 structure is shown in FIG. 4. The HS-DSCH DATA FRAME TYPE 3 carries a PI bitmap 402, a CFN frame number 400, a H-RNTI 404 of the UE for which there is data and field HI 406 is set to 1, indicating that the HS-SCCH encoded with the H-RNTI would be transmitted before the associated HS-PDSCH is sent. Also provided is afield MUI (Multiuser Indication) 408 in the HS-DSCH DATA FRAME TYPE 3. In this example the MUI field is set to MUI=1, which would indicate to the Node B that another HS-DSCH DATA FRAME TYPE 3 for another UE is coming, which needs to be scheduled for the same CFN frame (the CFN frame number which was included in the first HS-DSCH FRAME TYPE 3). Thus the first HS-DSCH DATA FRAME TYPE 3 is received by the node B In step S2, the RNC sends a second/next HS-DSCH DATA FRAME TYPE 3 to Node B with the same CFN frame number, which was put in the first/earlier HS-DSCH DATA FRAME TYPE 3, H-RNTI of the second/next UE. DCCH or DTCH PDU for this second/next UE, and the field HI is set to 1. The MUI field is set to MUI=1 and other fields are filled accordingly. It should be appreciated that the PI bitmap may be omitted from this second HS-DSCH DATA FRAME TYPE 3, as the paging occasions of the second UE, and the first UE mentioned in the first/earlier HS-DSCH DATA FRAME TYPE 3 are the same. As the paging occasions are the same the PI bitmap is also the same and hence, there is no need to repeat the same information in each HS-DSCH DATA FRAME TYPE 3. However, in some embodiments, the PI bitmap may be included in the second data frame. Thus the second HS-DSCH DATA FRAME TYPE 3 is received by the node B.

In step S3, the RNC sends the third/next HS-DSCH DATA FRAME TYPE 3 to Node B with the same CFN frame number, which was put in the first/earlier HS-DSCH DATA FRAME TYPE 3, the H-RNTI of the third UE. DCCH or DTCH PDU for this third UE, and field HI is set to 1, and other fields are filled accordingly. However, the MUI field is set to 0. This is because this is the last HS-DSCH DATA FRAME TYPE 3, which needs to be scheduled for the same CFN. Thus the third HS-DSCH DATA FRAME TYPE 3 is received by the node B.

In step S4, on detecting that the MUI field is set to MUI=0 in the HS-DSCH DATA FRAME TYPE 3, the Node B knows that no more HS-DSCH DATA FRAME TYPE 3 will come for the same CFN frame, and this is the last HS-DSCH DATA FRAME TYPE 3 for scheduling in the same CFN frame. The Node B will transmit the PI bitmap in the PICH at frame number CFN-1, that is the frame prior to the one in which the data for the UEs is to be transmitted. The UEs will monitor the PICH.

In step S5, all the UEs which detect their paging indicator in the transmitted PICH, prepare to monitor HS-SCCH code set. The Node B transmits the HS-SCCH for monitoring by the UEs and then transmits the HS-PDSCH sub frames. The HD-PDSCH sub frames will contain the DCCH or DTCH PDU and are transmitted in the frame number CFN, i.e. the next frame after the CFN-1. The HS-SCCH is also transmitted in frame number CFN. In step S6, once the UE decodes the HS-SCCH code successfully with help of its dedicated H-RNTI, the UE decodes the HS-PDSCH sub frame associated with decoded HS-SCCH sub frame. Similarly, other UEs which have detected their paging indicator, start monitoring the HS-SCCH in other sub frames of the CFN. On successful decoding of the HS-SCCH with help of their dedicated H-RNTI, these UEs decode the HS-PDSCH sub frame associated with HS-SCCH, and get their DCCH or DTCH PDU.

All other UEs which had detected the paging indicator, but could not decode any HS-SCCH successfully, go to sleep, and wake up in their paging occasion in next DRX cycle.

Figure 6:
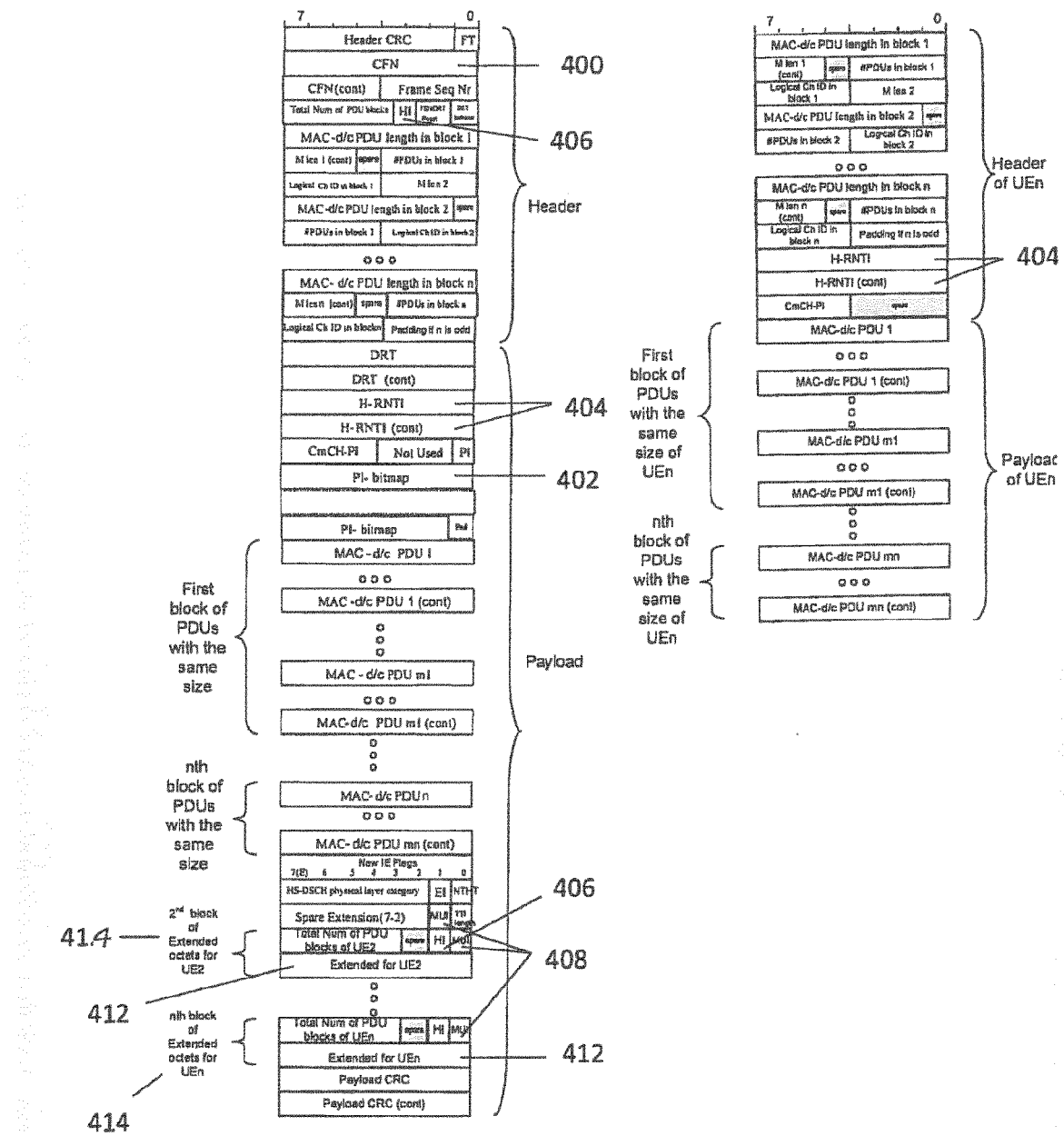
FIG. 6 shows another frame of an embodiment.
Figure 7:
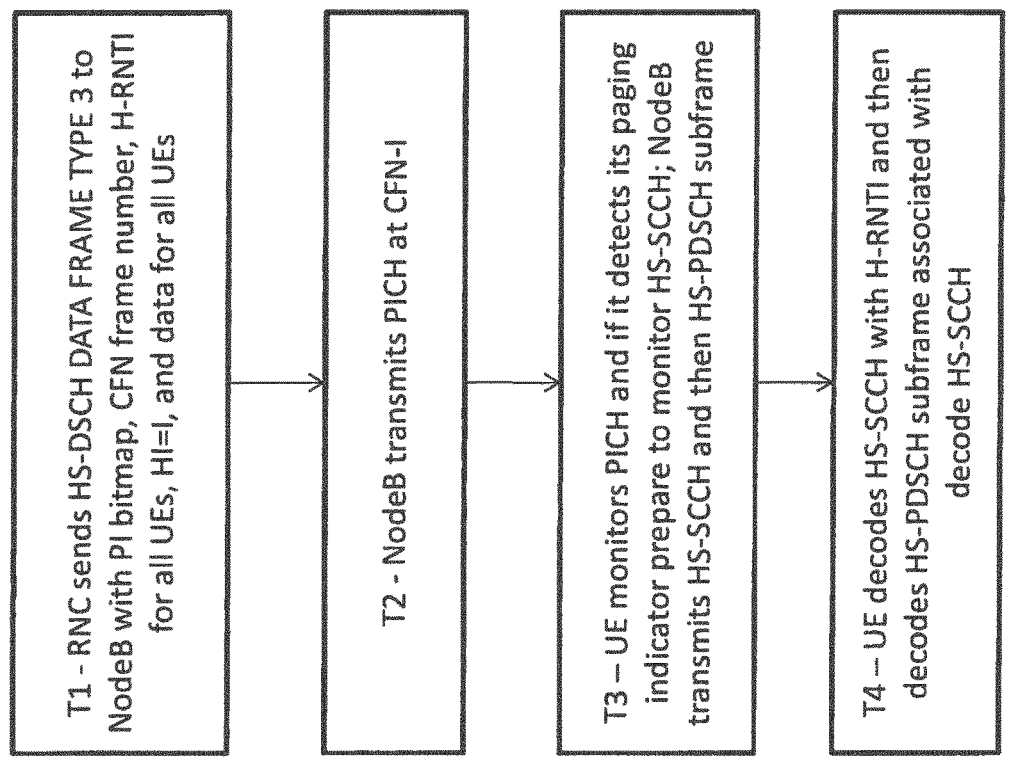
FIG. 7 shows a method flow associated with the frame of FIG. 6.

Reference is made to FIG. 6 which shows the HS-DSCH DATA FRAME TYPE3 which includes more than one UE's data in one frame. The Node B receives all UEs' data in one frame and schedules that data in the CFN indicated by the CFN field in HS-DSCH DATA FRAME TYPE 3. FIG. 7 shows a method flow.

The example described with reference to FIGS. 6 and 7, again the RNC has to send one or more of mobile terminating call (MTC) paging, a control signal message, a DCCH and/or DTCH PDU to three UEs. It should be appreciated that the RNC may be sending the same type of messaging to each of the three UEs or one or more of the UEs may be receiving a different type of messaging to the one or more other UEs.

In step T1, the RNC puts the DCCH/DTCH PDUs of all the UEs, to be scheduled in the same CFN frame, in one HS-DSCH DATA FRAME TYPE 3 rather than sending separate HS-DSCH DATA FRAME TYPE 3 for each UE as described previously. The DCCH or DTCH PDUs and/or other data of all the UEs which are to be scheduled in same CFN, are in the same HS-DSCH DATA FRAME TYPE 3 as shown in the FIG. 6. An IE information element or other type of field may be provided to include data of another UE which shall be provided in the same CFN. The existence of the IE information element or otherwise may be indicated by afield MUI (Multiuser Indication) located in a block of the previous UE. In FIG. 6, this field is extended for UEn and is referenced 412. As shown in FIG. 6, the HS-DSCH DATA FRAME TYPE 3 carries a PI bitmap 402 for the paging occasion, and all these UEs whose DCCH or DTCH PDUs or the like data are added in this same HS-DSCH DATA FRAME TYPE 3, belong to same paging occasion. The information for the first UE is provides in the header and payload as previously. However, the payload now additionally includes a block of extended octets, one for each additional UE. Each block 414 of extended octets belonging to a separate UE, carries the following fields: MUI 408, HI 406, and H-RNTI 404 of that UE. The HRNTI of the $2^{nd}$ and subsequent UEs are located in the respective extended for UE field 412. If the MUI (multiuser indication)=1, this means that a block of extended octets for another UE is following, and MUI=0, means this is block of extended octets of last UE, which would be scheduled for the same CFN. The frame also includes header information for each of the subsequent UE and their associated PDUs.

Similarly, HI=1, means that HS-SCCH would be encoded with the H-RNTI of the UE to which this block of extended octets belong. If HI=0, it means that no HS-SCCH would be transmitted for this UE. Logical channel DCCH or DTCH PDUs would not be included in the HS-DSCH DATA FRAME TYPE 3, but another logical channel e.g., PCCH PDU could be added in the same HS-DSCH DATA FRAME TYPE3, if the UE to which PCCH PDU(s) are being sent also belong to same paging occasion.

The information for the first user equipment is included in the normal header. This header will include CFN, and the HI field. The H-RNTI for the first user equipment and the PI map is included in the payload as usual. After the payload associated with the first user equipment, n-1 blocks are provided for the n-1 remaining user equipment. As mentioned, each of these blocks has the MUI and HI for each user equipment. This is then followed by the header for the next user equipment and its payload and so on.

It should be appreciated that steps T2, T3 and T4 respectively correspond to steps S4, S5 and S6 of FIG. 5.

Some embodiments may have the advantage that not only logical channels DCCH or DTCH could be scheduled in the same CFN, but a mix of logical channel DCCH/DTCH and logical channel PCCH may be scheduled in the same CFN. In some embodiments, the logical channel PCCH, and logical channel CCCH may be scheduled in the same CFN, where the logical channel CCCH is proposed to carry for example Radio Bearer Reconfiguration to the one UE, which is waiting to receive this RRC message in this CFN frame.

In case the RNC has to send ETWS information and/or BCCH modification information to UEs in the cell, then in some embodiments the PCCH PDU, and BCCH PDU could be sent in one HS-DSCH DATA FRAME TYPE 3 to Node B. and Node B could schedule both PCCH PDU and BCCH PDU in the same CFN. The Node B sends the PICH in the frame CFN-1. For transmitting the BCCH PDU, the Node B encodes the first indexed HS-SCCH code with the BCCH specific H-RNTI, and maps the BCCH PDU to the HS-DSCH/HS-PDSCH. For transmitting the PCCH PDU, the node B does not send the HS-SCCH, but maps the PCCH PDU to the HS-DSCH and transmits in a first sub frame of HS-PDSCH. In this way, the RNC can inform all the UEs in cell about ETWS information and/or BCCH modification information through one DRX cycle rather than 2 DRX cycle.

It may be noted that UEs in CELL_PCH, without a dedicated H_RNTI, receive ETWS information and BCCH modification information through the RRC message PAGING TYPE 1 which is transmitted over PCCH, and UEs in CELL_PCH with a dedicated H-RNTI receive ETWS Information, and BCCH modification information through RRC message SYSTEM INFORMATION CHANGE INDICATION, which is transmitted over the BCCH.

For a Node B's capability to receive PDUs for more than one UE for the same CFN frame through HS-DSCH DATA FRAME TYPE 3, the Node B informs the controlling RNC (CRNC) in a NBAP (node B application part) message such as AUDIT RESPONSE or RESOURCE STATUS INDICATION or the like. This may be indicated by an IE referred to as a scheduling of more than one UE in the same CFN frame or the like. This may be in the IE-Enhanced PCH capability- or the like in the NBAP message AUDIT RESPONSE and RESOURCE STATUS INDICATION.

When RNC finds out through the NBAP message about a Node B's capability, and if the RNC has a MTC call or control signal message for more than one UE in same paging occasion, and these UEs have been assigned dedicated H-RNTI, then the HS-DSCH DATA FRAME TYPE 3 as discussed above may be sent to the Node B.

In the above embodiments, reference has been made to the H-RNTI. It should be appreciated that in other embodiments, any other suitable identity for the user equipment or a set of user equipment may be used.

In the above embodiments, the MUI field has been described as being provided by a single bit. It should be appreciated that in other embodiments, more than one bit may be provided.

In the above embodiments, the MUI field has been set to 1 if there is a further frame containing information which is to be scheduled in the same CFN frame. It should be appreciated that in other embodiments, this may be indicated by a value of 0, with 1 indicating that there is no further frame to come with data to be scheduled in the same CFN frame.

In other embodiments, the information about the one or more additional UE to be scheduled in the same CFN or other scheduling occasion may be provided in any other suitable manner.

The above embodiments have used the CFN scheduling parameter. It should be appreciated that other embodiments may use any other suitable scheduling parameter or occasion.

In some of the above embodiments, the PI bitmap is transmitted in the immediately preceding frame number to that containing the data for the user equipment. It should be appreciated that in some embodiments, the PI bitmap may not be immediately preceding the frame in which the data is transmitted and instead the frames may be separated by one or more other frames.

Embodiments have been described particularly with reference to HS-DSCH DATA FRAME TYPE 3. However, it should be appreciated that the principles of this may be applied to any other suitable scenario. Embodiments may be used where, for example, there may be more than one user equipment for which data is to be transmitted in the same frame or scheduling window.

The data may take any suitable form and may for example be MTC paging, a control signal message, a packet data unit, a segment of data or any other suitable data.

It should be appreciated that reference has been made to use such several specific channels. It should be appreciated that other embodiments may be used with one or more different channels providing the same or similar function to those previously described.

The above described embodiments have been in a HSPA context. It should be appreciated that other embodiments may be used in any other suitable non HSPA context.

The above embodiments have described some examples of how information is conveyed. It should be appreciated that other embodiments may convey information using any other suitable method or format.

The above embodiments have been described in relation to a cell PCH or URA PCH mode. It should be appreciated that other embodiments may be used with other types of mode. Those modes may be a mode in which the UE is in a connected state but where the UE and network resources required to be in that state are relatively low or at a minimum.

The above embodiments have been described in relation to sending to three UEs. This is for illustrative purposes and other embodiments can be used where there are more or less than three UEs.

In general, the various embodiments may be implemented in hardware or special purpose circuits, software, logic or any combination thereof. Some aspects may be implemented in hardware, while other aspects may be implemented in firmware or software which may be executed by a controller, microprocessor or other computing device, although the invention is not limited thereto. While various aspects may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Some embodiments may be implemented by computer software executable by a data processor of the mobile device, such as in the processor entity, or by hardware, or by a combination of software and hardware.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory.

Although the application has been described herein above with reference to specific embodiments, it is not limited to these embodiments and no doubt further alternatives will occur to the skilled person, that lie within the scope of the invention as claimed.

The invention claimed is:

1. A method comprising:
receiving information, at a base station from a radio network controller, for a plurality of user equipment in one frame, said information comprising data for the plurality of user equipment, said data to be transmitted in a same scheduling interval, said one frame comprising a plurality of parts which are associated with respective ones of said plurality of user equipment, wherein each of said plurality of parts comprises an indication, wherein one of: the indication is set to a first value to indicate a subsequent part of the plurality of parts contains data to be transmitted in the same scheduling interval, and the indication is set to a second value to indicate the part associated with indication is a last part of the plurality of parts in the one frame; and in response to determining an end of the one frame based on the second value, causing said data to be transmitted in the same scheduling interval to the plurality of user equipments.

2. A method as claimed in claim 1, comprising causing a control channel to be transmitted, said control channel comprising control information for said plurality of user equipment, said control information being such that each of said user equipment is configured to use identity information to decode control information for that user equipment.

3. A method as claimed in claim 1, wherein said data for the plurality of user equipment comprises one or more of:
a packet data unit for at least one of the plurality user equipment,
a paging message for at least one of the plurality user equipment, and
a control signal message for at least one of the plurality user equipment.

4. A method as claimed in claim 3, wherein said packet data unit comprises one or more logical channel packet data unit.

5. A method as claimed in claim 4, wherein said data for each of the plurality of user equipment comprises two or more packet data units for at least two different logical channels.

6. A method as claimed in claim 1, wherein said information comprises scheduling information identifying said scheduling interval.

7. A method as claimed in claim 1, comprising receiving paging information at said base station for said plurality of user equipment.

8. A computer program product comprising computer executable instructions which when run cause the method of claim 1 to be performed.

9. A method comprising:
determining by a radio network controller that data needs to be sent to a plurality of user equipment in a cell of a base station; and
causing information to be transmitted from the radio network controller to the base station for the plurality of user equipment, said information comprising the data for the plurality of user equipment in one frame, said data to be transmitted in a same scheduling interval, said one frame comprising a plurality of parts which are associated with respective ones of said plurality of user equipment, wherein each of said plurality of parts comprises an indication, wherein causing the information to be transmitted comprises: setting the indication to a first value for each of one or more first parts of the plurality parts to indicate a subsequent part of the plurality of parts in the one frame contains data to be transmitted in the same scheduling interval, and setting the indication for a second part of the plurality of parts to a second value to indicate that the second part is a last part of the plurality of parts in the one frame.

10. The method as claimed in claim 9, wherein the method is performed by at least part of a radio network controller.

11. The method as claimed in claim 9, further comprising receiving, from the base station, an indication indicating that the base station is capable of receiving the information for the plurality of user equipment in the one frame.

12. An apparatus comprising:
at least one processor, and
at least one non-transitory memory including computer code for one or more programs, the at least one memory and the computer code configured, with the at least one processor, to cause the apparatus at least to:
receive information from a radio network controller at a base station for a plurality of user equipment in one frame, said information comprising data for the plurality of user equipment, said data to be transmitted in a same scheduling interval, said one frame comprising a plurality of parts which are associated with respective ones of said plurality of user equipment, wherein each of said plurality of parts comprises information an indication, wherein one of: the indication is set to a first value to indicate a subsequent part of the plurality of parts contains data to be transmitted in the same scheduling interval, and the indication is set to a second value to indicate the part associated with indication is a last part of the plurality of parts in the one frame; and
cause said data to be transmitted in the same scheduling interval.

13. An apparatus as claimed in claim 12, wherein the at least one memory and the computer code are configured, with the at least one processor, to cause the apparatus to cause a control channel to be transmitted, said control channel comprising control information for said plurality of user equipment, said control information being such that each of said user equipment is configured to use identity information to decode control information for that user equipment.

14. The apparatus as claimed in claim 12, wherein said data for the plurality of user equipments comprises one or more of:
a packet data unit for at least one of the plurality user equipment,
a paging message for at least one of the plurality user equipment, and
a control signal message for at least one of the plurality user equipment.

15. The apparatus as claimed in claim 14, wherein said packet data unit comprises one or more logical channel packet data unit.

16. The apparatus as claimed in claim 15, wherein said data for each of the plurality of user equipment comprises two or more packet data units for at least two different logical channels.

17. The apparatus as claimed in claim 12, wherein said information comprises scheduling information identifying said scheduling interval.

18. The apparatus as claimed in claim 12, wherein the at least one memory and the computer code are configured, with the at least one processor, to cause the apparatus at least to:
receive paging information at said base station for said plurality of user equipment.

19. The apparatus as claimed in claim 12, wherein a radio network controller comprises the apparatus.

20. The apparatus as claimed in claim 12, wherein the at least one memory and the computer code are configured, with the at least one processor, to cause the apparatus at least to:

receive, from the base station, an indication indicating that the base station is capable of receiving the information for the plurality of user equipment in the one frame.

21. An apparatus comprising:
at least one processor, and
at least one non-transitory memory including computer code for one or more programs, the at least one memory and the computer code configured, with the at least one processor, to cause the apparatus at least to:
determine by a radio network controller that data needs to be sent to a plurality of user equipment in a cell of a base station; and
cause information to be transmitted from the radio network controller to the base station for the plurality of user equipment in one frame, said information comprising the data for the plurality of user equipment, said data to be transmitted in a same scheduling interval, said one frame comprising a plurality of parts which are associated with respective ones of said plurality of user equipment, wherein each of said plurality of parts comprises an indication, wherein causing the information to be transmitted comprises: setting the indication to a first value for each of one or more first parts of the plurality parts to indicate a subsequent part of the plurality of parts in the one frame contains data to be transmitted in the same scheduling interval, and setting the indication for a second part of the plurality of parts to a second value to indicate that the second part is a last part of the plurality of parts in the one frame.

* * * * *